US008061522B2

(12) United States Patent
Eskenazi et al.

(10) Patent No.: US 8,061,522 B2
(45) Date of Patent: *Nov. 22, 2011

(54) REUSABLE SHIPPING CONTAINER

(75) Inventors: Ken Eskenazi, Pasadena, CA (US); Seri McClendon, Pasadena, CA (US); Barent Roth, Torrance, CA (US); Anthony Guido, Philadelphia, PA (US)

(73) Assignee: Ken Eskenazi, Los Angeles, CA (US)

( * ) Notice: Subject to any disclaimer, the term of this patent is extended or adjusted under 35 U.S.C. 154(b) by 80 days.

This patent is subject to a terminal disclaimer.

(21) Appl. No.: 11/865,714

(22) Filed: Oct. 1, 2007

(65) Prior Publication Data
US 2009/0084703 A1 Apr. 2, 2009

(51) Int. Cl.
B65D 85/30 (2006.01)

(52) U.S. Cl. ........................ 206/591; 206/594

(58) Field of Classification Search .................. 206/591, 206/521, 583, 594, 503, 511, 509, 522, 523; 150/115, 120, 121; 220/839, 835, 836, 4.21–4.32, 220/921, 4.23; 229/922, 406
See application file for complete search history.

(56) References Cited

U.S. PATENT DOCUMENTS

| | | | | |
|---|---|---|---|---|
| 1,063,894 A * | 6/1913 | Smith | ............................ | 206/591 |
| 1,813,256 A * | 7/1931 | Radkus | ......................... | 206/594 |
| 1,843,543 A * | 2/1932 | De Reamer | ................ | 206/521.1 |
| 3,256,975 A * | 6/1966 | Puente | ........................... | 206/706 |
| 3,552,595 A | 1/1971 | Gerner et al. | | |
| 3,567,013 A | 3/1971 | Tannebaum | | |
| 3,961,708 A | 6/1976 | von Dohlen et al. | | |
| 3,979,020 A | 9/1976 | Braber et al. | | |
| 3,999,661 A * | 12/1976 | Jones | ............................ | 206/591 |
| 4,505,404 A * | 3/1985 | Perchak et al. | ............... | 220/834 |
| 5,183,159 A | 2/1993 | Hojnacki et al. | | |
| 5,405,000 A * | 4/1995 | Hagedon et al. | ............... | 206/216 |
| 5,553,444 A * | 9/1996 | Lovecky et al. | ................. | 53/453 |
| 5,641,068 A | 6/1997 | Warner | | |
| 5,699,925 A * | 12/1997 | Petruzzi | ....................... | 220/4.27 |
| 5,738,216 A | 4/1998 | Warner | | |
| 5,954,203 A * | 9/1999 | Marconi | ........................ | 206/464 |
| 6,065,870 A * | 5/2000 | Nunez | ................................ | 383/3 |
| 6,513,658 B1 * | 2/2003 | Adkins | .......................... | 206/522 |
| 6,520,333 B1 * | 2/2003 | Tschantz | ....................... | 206/522 |

(Continued)

OTHER PUBLICATIONS

Eskenazi, "E—EPA—The Rapioli," http://www.cleanagency.com, Oct. 2003, 1 sheet; Clean Agency, Pasadena, California.
U.S. Environmental Protection Agency, "Rapioli," http://www.epa.gov/, Oct. 2003, 1 sheet, United States Environmental Protection Agency, Washington, D.C.

*Primary Examiner* — Mickey Yu
*Assistant Examiner* — Jenine Pagan
(74) *Attorney, Agent, or Firm* — Christie, Parker & Hale, LLP

(57) ABSTRACT

In an embodiment according to the invention, a reusable shipping container for shipping an item includes an outer clamshell carton and first and second convex pillows. The outer clamshell carton has first and second receptacles foldable toward each other along a hinge. The first convex pillow is foldable in and out of the first receptacle, and the second convex pillow is foldable in and out of the second receptacle. The first and second convex pillows face each other when they are folded into the respective first and second receptacles and the outer clamshell carton is closed. The first and second convex pillows are resilient to deflect into a concave shape with the item between them. The outer clamshell carton, the hinge, and the first and second convex pillows are integrally molded from one material.

21 Claims, 8 Drawing Sheets

U.S. PATENT DOCUMENTS

| | | |
|---|---|---|
| 6,520,337 B2 | 2/2003 | Smith |
| 6,976,586 B2 * | 12/2005 | Halpin .......................... 206/583 |
| D516,388 S | 3/2006 | Wells |
| 2006/0042995 A1 * | 3/2006 | McGrath et al. .............. 206/583 |

* cited by examiner

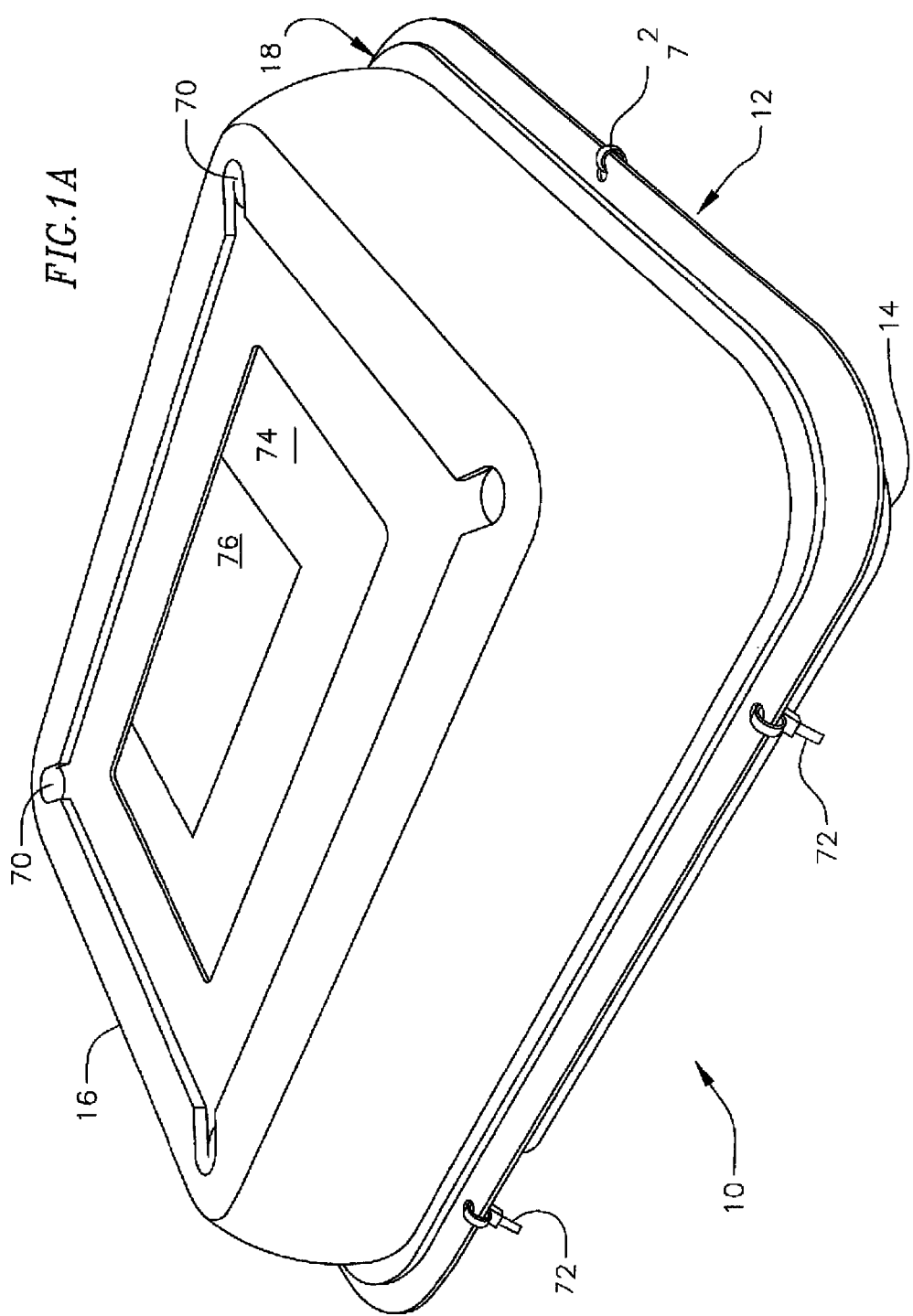

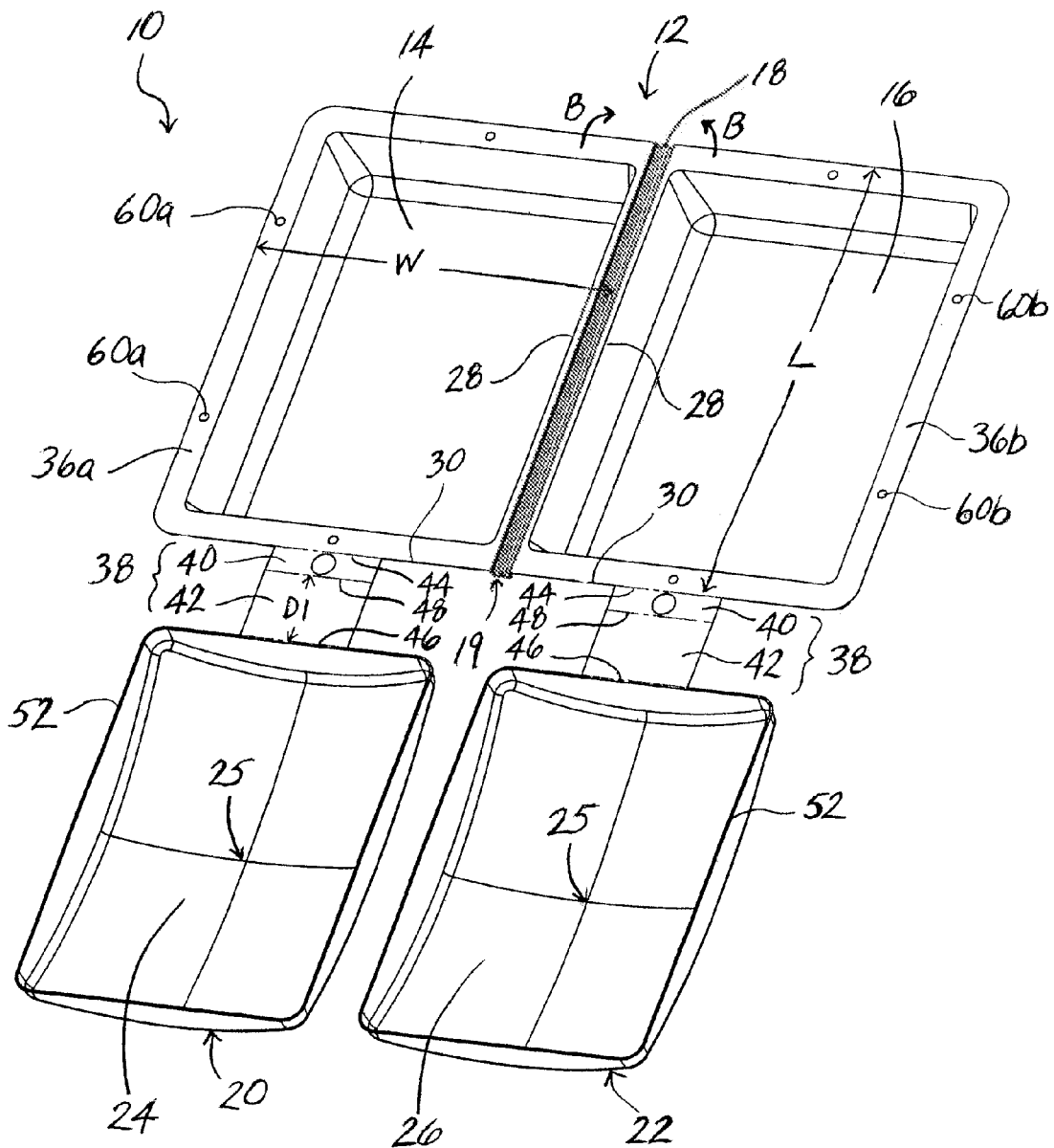

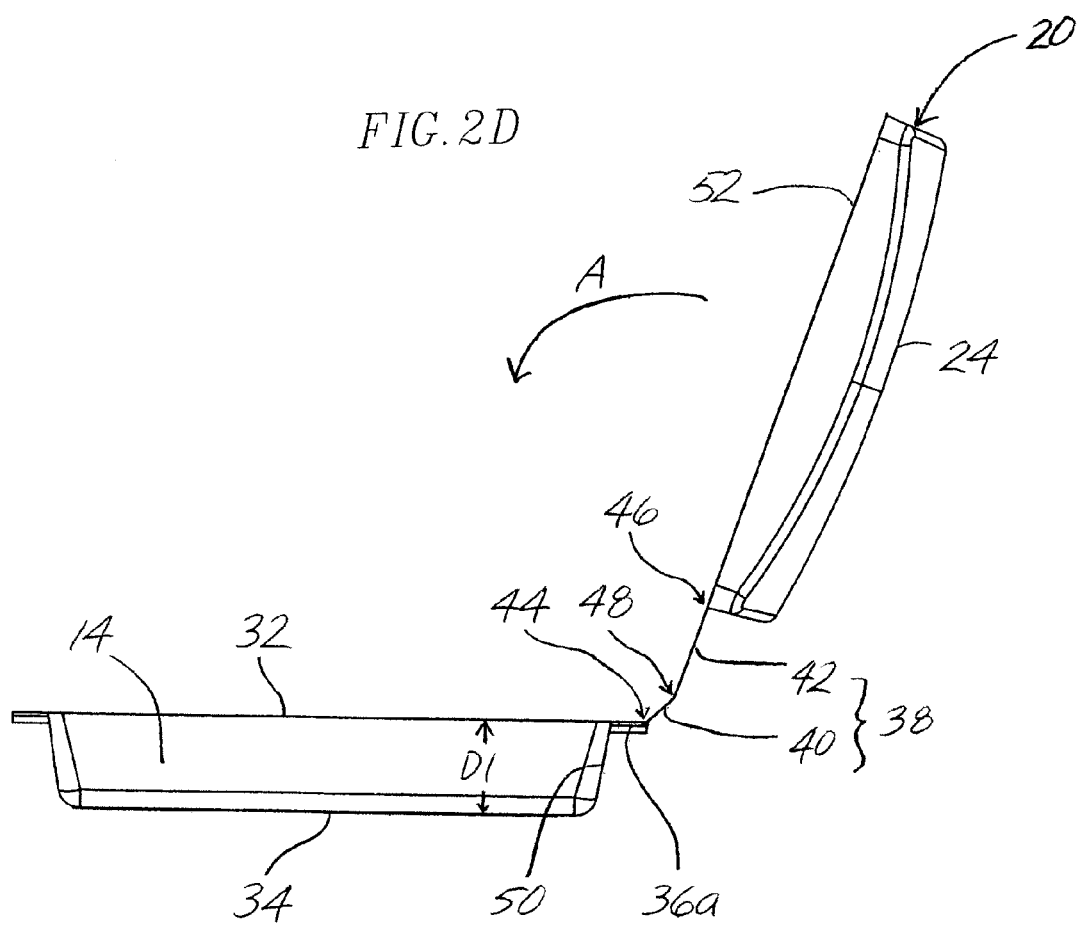

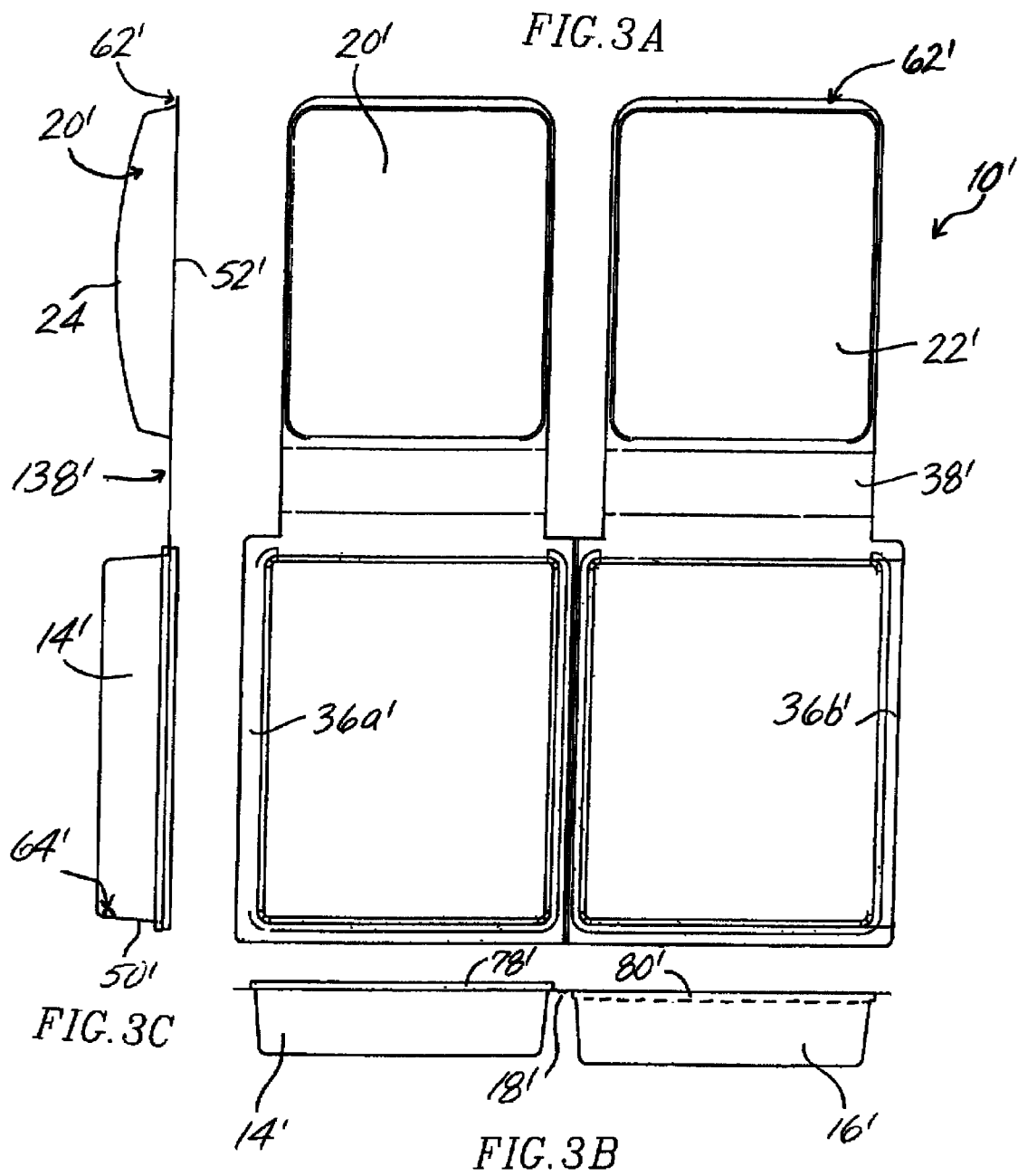

REUSABLE SHIPPING CONTAINER

FIELD OF THE INVENTION

The present invention relates to shipping containers, and more particularly to a reusable shipping container with integrally formed cushioning.

BACKGROUND OF THE INVENTION

Shipping containers often include disposable packing or cushioning materials that are placed inside an outer container to cushion and protect the product being shipped. These materials, such as foam blocks, crinkled paper, bubble wrap, peanuts, and other types of packaging, are typically disposed of when the product reaches its destination. This method of shipping produces large amounts of waste material.

Some shipping containers attempt to remedy this problem by utilizing containers that are specially molded to carry a specific item. For example, such a container may include a concave, molded recess that matches the shape of a product being shipped. The product being shipped is protected inside this custom molded recess, so the container requires less disposable cushioning material to safely ship the product. However, the container cannot be reused unless the next product being shipped is the same shape as the first one, so that it can fit into the same concave molded recess. Other prior art shipping containers consist of multiple different pieces and/or materials that are assembled together to form a cushioning container. These containers are complicated and expensive and often create large amounts of waste material.

Accordingly, there is still a need for a shipping container that can be reused for many different products and that cushions and protects the products without generating large amounts of waste material.

SUMMARY OF THE INVENTION

In one embodiment according to the invention, a reusable shipping container includes an outer clamshell container, and first and second inner cushions. The outer clamshell container includes a first outer section and a second outer section connected to each other along an outer section hinge. The first inner cushion is connected to the first outer section along a first cushion hinge, and the second inner cushion connected to the second outer section along a second cushion hinge. The first and second inner cushions have first and second convex pillows. The first inner cushion is foldable along the first cushion hinge to position the first convex pillow inside the first outer section, and the second inner cushion is foldable along the second cushion hinge to position the second convex pillow inside the second outer section. The first and second convex pillows face each other when the first and second outer sections are folded together along the outer section hinge. The outer clamshell container, the first and second outer sections, the outer section hinge, the first and second inner cushions, the first and second convex pillows, and the first and second cushion hinges are integrally formed from one common material.

In another embodiment according to the invention, a reusable shipping container for shipping an item includes an outer container and first and second inner sections. The outer container has first and second clamshell sections hingedly connected to each other. The first inner section is hingedly connected to the first clamshell section and includes a first pillow with a convex bulge. The second inner section is hingedly connected to the second clamshell section and includes a second pillow with a convex bulge. The first inner section is pivotable with respect to the first clamshell section to position the first pillow in the first clamshell section, and the second inner section is pivotable with respect to the second clamshell section to position the second pillow in the second clamshell section, such that the convex bulges of the first and second pillows face each other when the outer container is closed. The first and second pillows are deflectable into a concave shape to receive the item between them, with the first and second pillows urging against the item to return toward their convex bulges. The outer container and the first and second inner sections are integrally formed from one material.

In another embodiment according to the invention, a reusable shipping container for shipping an item includes an outer clamshell carton and first and second convex pillows. The outer clamshell carton has first and second receptacles foldable toward each other along a hinge. The first convex pillow is foldable in and out of the first receptacle, and the second convex pillow is foldable in and out of the second receptacle. The first and second convex pillows face each other when they are folded into the respective first and second receptacles and the outer clamshell carton is closed. The first and second convex pillows are resilient to deflect into a concave shape with the item between them. The outer clamshell carton, the hinge, and the first and second convex pillows are integrally molded from one material.

In yet another embodiment according to the invention, a method of manufacturing a reusable shipping container includes providing a mold with an outer clamshell container and first and second inner cushions. The method also includes vacuum forming a sheet of material into the mold to form a molded portion of the sheet of material, and cutting a perimeter around the molded portion of the sheet of material. The method also includes forming living hinges in the molded portion of the sheet, and cooling the molded portion.

BRIEF DESCRIPTION OF THE DRAWINGS

FIG. 1A is a top perspective photo reproduction of a reusable shipping container in a closed position, according to an embodiment of the present invention.

FIG. 2C is a perspective view of the reusable shipping container of FIG. 2A, in an unfolded position.

FIG. 2D is a side elevational view of the reusable shipping container of FIG. 2A, in a partially folded position.

FIG. 3A is a plan view of a reusable shipping container in an unfolded position, according to another embodiment of the present invention.

FIG. 3B is a front elevational view of the reusable shipping container of FIG. 3A.

FIG. 3C is a left side elevational view of the reusable shipping container of FIG. 3A.

DETAILED DESCRIPTION OF THE INVENTION

Figure 1B:
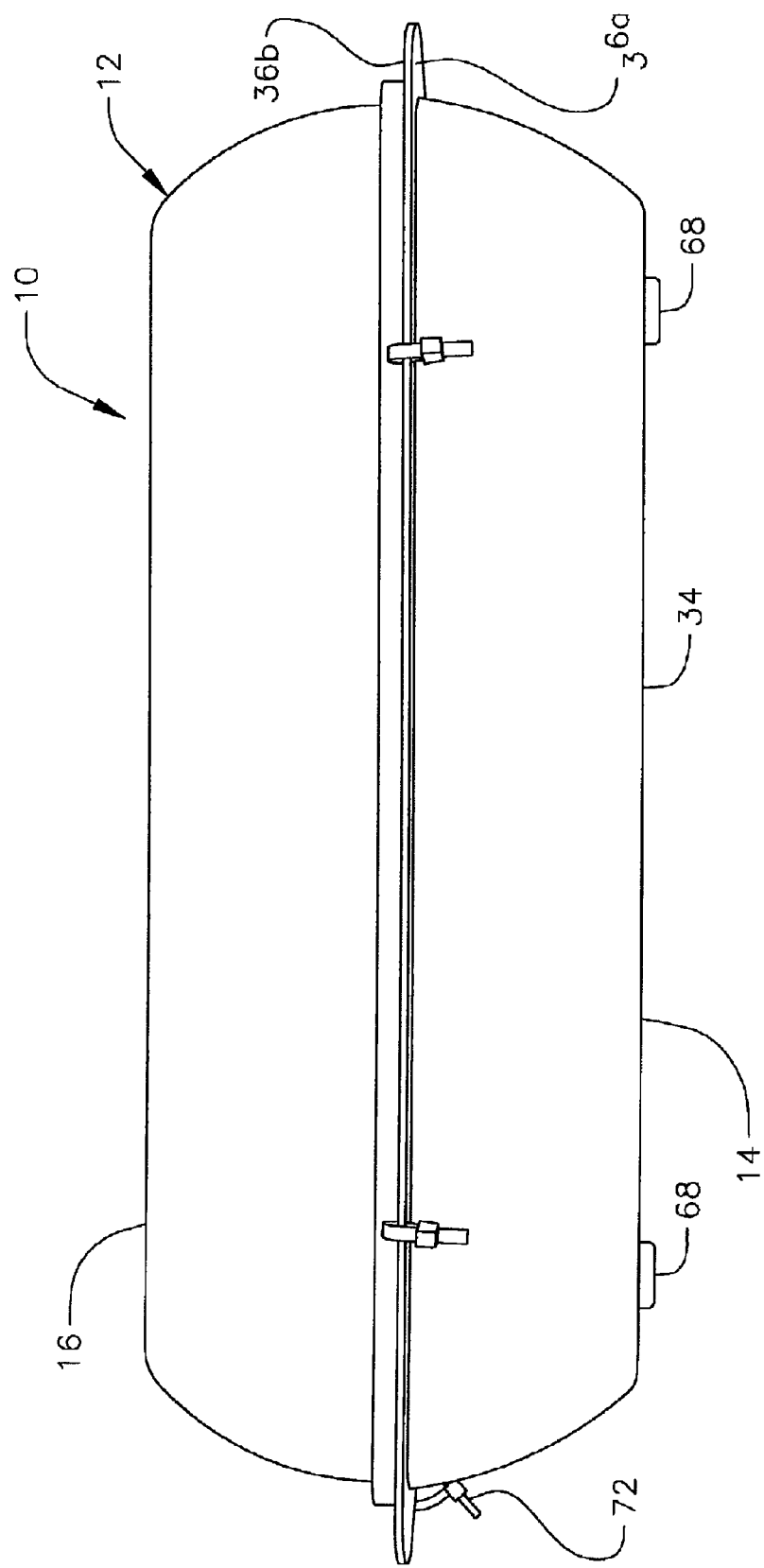
FIG. 1B is a side elevational photo reproduction of the reusable shipping container of FIG. 1A.

A reusable shipping container according to one embodiment of the present invention is shown in FIGS. 1A-1B. The reusable shipping container 10 includes an outer clamshell container 12 with first and second outer sections or trays 14, 16 that fold toward each other along a flexible living hinge 18. Inside the outer clamshell container 12, two inner pillows (not shown) resiliently cushion the item being shipped. When the shipping container 10 arrives at its destination, the item being shipped can be removed, and the shipping container 10 is then ready to ship another item. The container 10 can be reused multiple times to ship items of various sizes, without producing any waste material.

Figure 2A:
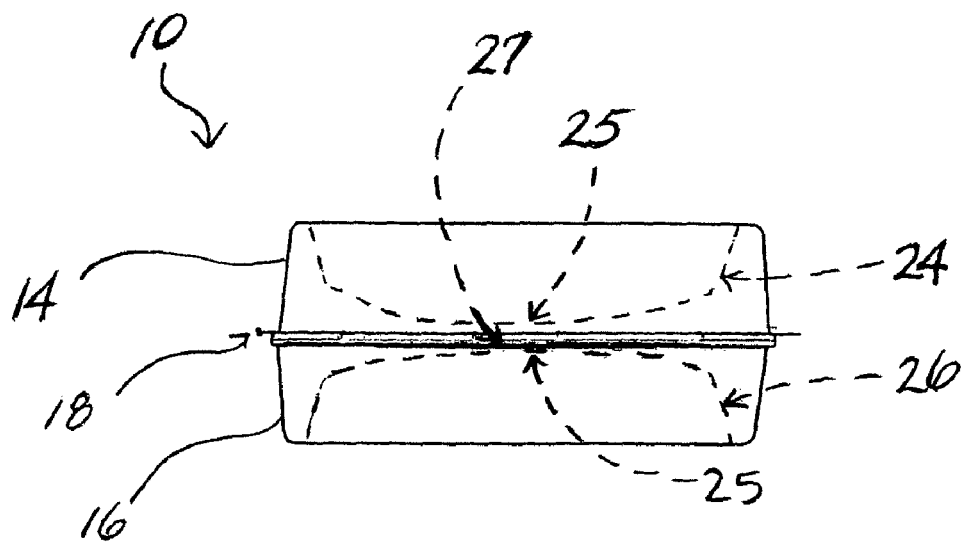
FIG. 2A is a side elevational view of a reusable shipping container in a closed position, according to an embodiment of the present invention.
Figure 2B:
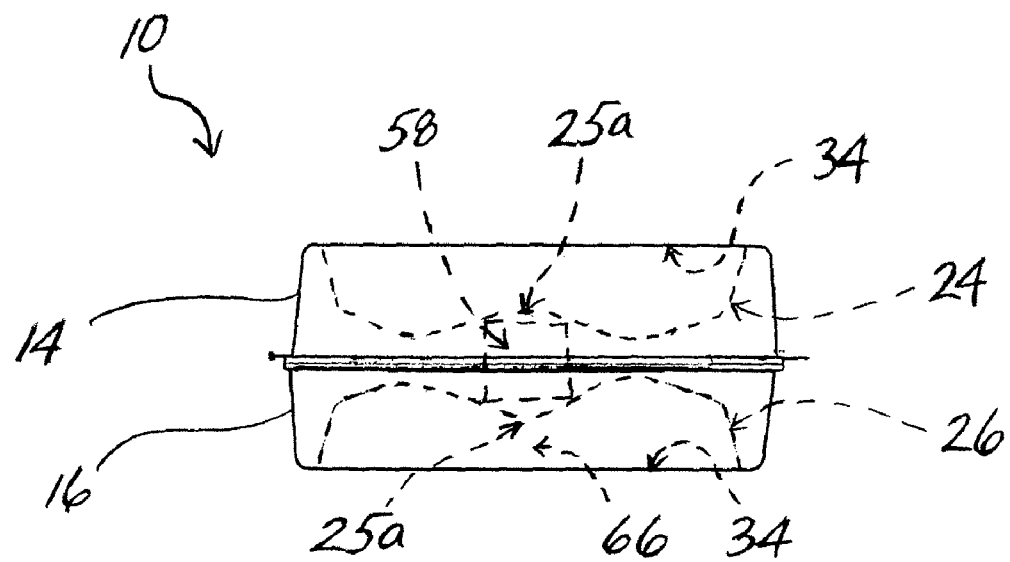
FIG. 2B is a side elevational view of the reusable shipping container of FIG. 2A, with an item placed inside.

The two inner pillows or cushions 24, 26 are indicated by dashed lines in FIGS. 2A-2B. The pillows 24, 26 each have a convex bulge 25 in the center of the pillow. In FIGS. 2A and 2B, the outer clamshell container 12 is closed, positioning the pillows 24, 26 with their convex bulges 25 facing each other, with a space 27 between them. The pillows 24, 26 are resilient, such that they can be deflected from and can recover their convex shape. As shown in FIG. 2B, the convex bulges 25 of the two pillows deflect into concave bowls 25a to receive an item 58 between them. The pillows 24, 26 are resilient and have shape memory such that they are urged to return toward their original convex shape. As a result, the concave bowl 25a of each pillow urges against the item 58 as the pillow tries to recover its convex bulge 25. The two pillows thus hold the item 58 in place between them, as each pillow urges toward the item 58 from opposite sides. The two pillows together form two matching bowls 25a on either side of the item to resiliently cushion the item and hold it in place.

In the embodiment shown in FIG. 2B, each of the deflected concave bowls 25a leaves a space 66 between itself and a bottom wall 34 of the outer container 14, 16. This space 66 provides some buffer for the item 58 to shift or move on the resilient pillow without coming into contact with the bottom wall 34. If the bottom wall 34 is damaged, the item 58, spaced away from the wall, is still protected.

The reusable shipping container 10 is shown in its open, unfolded position in FIG. 2C. The view in FIG. 2C is looking down into the container, with the open tops of the outer sections 14, 16 facing up in the drawing. The bulges 25 of the pillows 24, 26 are facing down into the page. The two outer sections 14, 16 are opened along the living hinge 18. The two outer sections 14, 16 have a generally rectangular shape with the hinge 18 joining them along one of their longer edges 28. In other embodiments, the outer sections can take on different shapes and/or be joined along different edges, such as along their shorter edges 30. The hinge 18 is a living hinge formed by creating one or more thinner regions in the material joining the two sections 14, 16. This thinner region is easier to bend than thicker regions, creating a natural, flexible hinge. The two outer sections 14, 16 can be rotated and folded about and along this hinge as indicated by arrows B until their outer rims 36a, 36b contact each other, bringing the outer clamshell container 12 to a closed position, as seen in FIG. 2A. The hinge 18 may include grooves or other folding details to increase flexibility.

Two inner sections 20, 22 support the two convex pillows 24, 26. These two inner sections 20, 22 are rotatable and foldable into the respective outer sections 14, 16 as indicated by arrow A. A bridge 38 connects each inner section 20, 22 to the respective outer section 14, 16. A living hinge 44 connects the bridge 38 to the outer section 14, 16, and another living hinge 46 connects the bridge 38 to the inner section 20, 22. The bridge 38 itself is divided by a third living hinge 48 into a rim portion 40 and a wall portion 42.

Figure 2E:
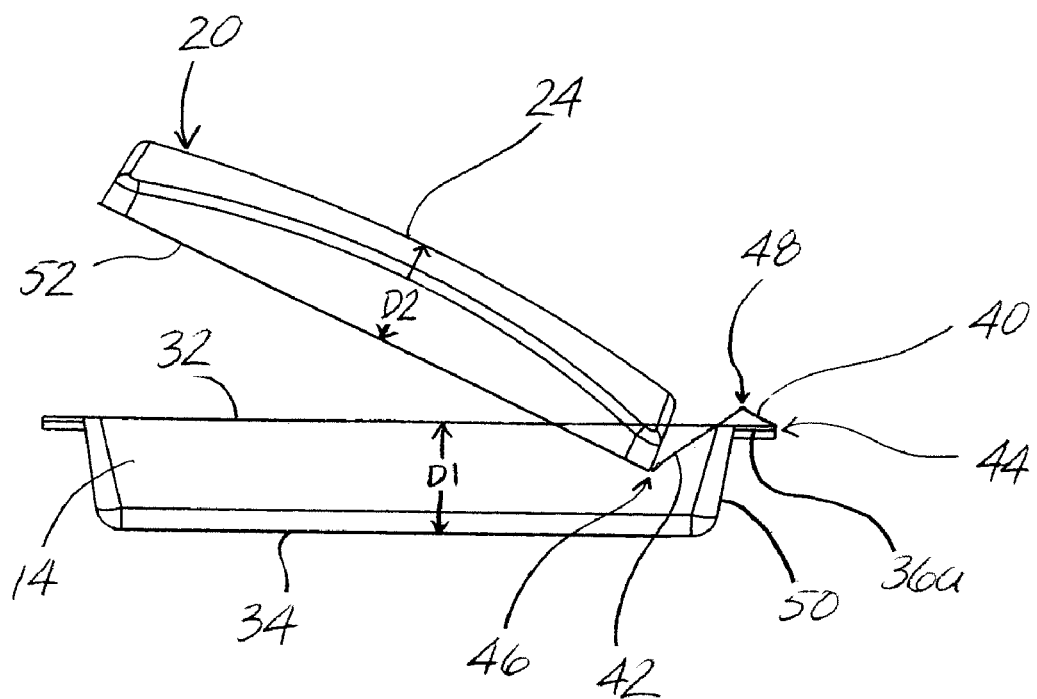
FIG. 2E is a side elevational view of the reusable shipping container of FIG. 2A, in a partially folded position.

The bridge 38 and the living hinges 44, 46, 48 enable the inner sections 20, 22 to be folded into the respective outer sections 14, 16, as shown in FIGS. 2D-2G. The inner section 20 is lifted up and rotated about the bridge 38, in the direction of the arrow A. The bridge itself rotates 180 degrees about the first living hinge 44, to position the rim portion 40 on top of, or overlapping, the rim 36a. The bridge 38 also rotates about the middle hinge 48 and lower hinge 46 to position the wall portion 42 of the bridge in alignment with the inside surface of the wall 50 of the outer section 14, as shown in FIG. 2E. When the rim portion 40 lines up on top of the rim 36a, and the wall portion 42 lines up along the wall 50, the pillow 24 is positioned inside the outer section 14.

Figure 2F:
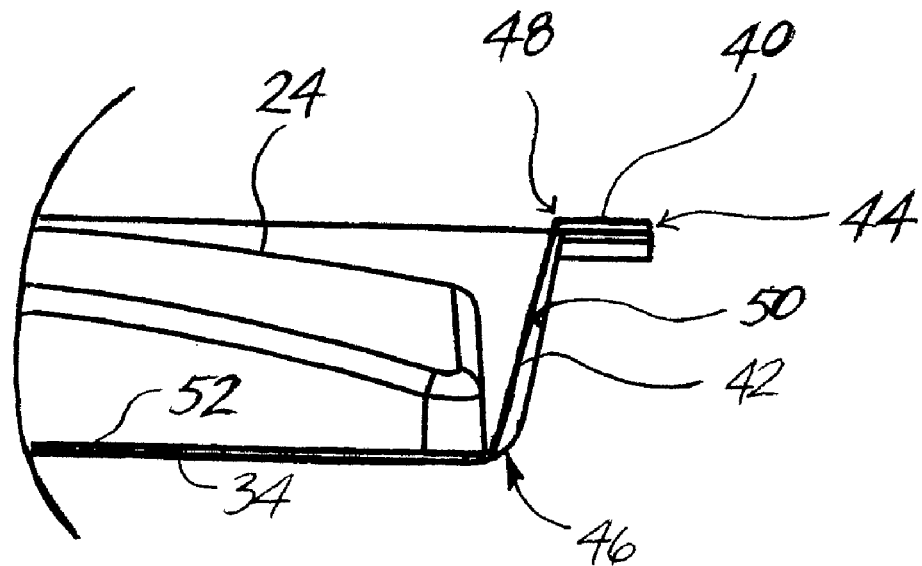
FIG. 2F is an enlarged view of an end of the reusable shipping container of FIG. 2A, in a folded position.
Figure 2G:
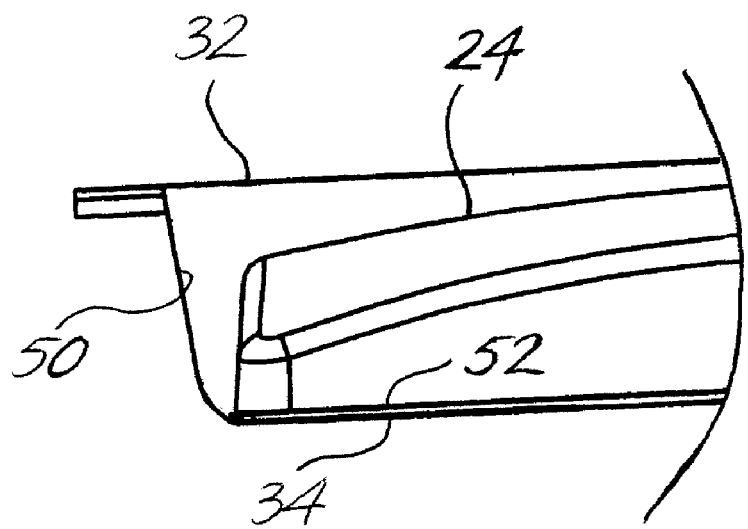
FIG. 2G is an enlarged view of an end of the reusable shipping container of FIG. 2A, in a folded position.

The wall portion 42 of the bridge 38 has a length D1 (see FIG. 2C) that is the same as the depth D1 (see FIGS. 2D-2E) of the outer sections 14, 16. Thus, when the bridge 38 is rotated about the hinge lines 44, 46, 48 to position the pillow inside the outer section, the wall portion 42 of the bridge lines up with the inside wall 50 of the outer section. Because the length of the wall portion 42 is the same as the height of the wall 50 (the depth D1), the wall section 42 extends all the way down along the wall 50 to the bottom 34 of the outer section, as shown in FIG. 2F. The bridge thus positions the pillow 24 on the bottom of the outer section such that the perimeter edge 52 of the pillow 24 rests on the inside surface of the bottom 34, as shown in FIGS. 2F and 2G. FIGS. 2F and 2G show close up, enlarged views of the right and left ends, respectively, of the shipping container shown in FIG. 2E, in a fully folded position.

As shown in FIG. 2E, the inner sections 20, 22 have a maximum depth D2 at the center of the convex pillows 24, 26. This depth D2 is greatest at the center of the pillow's convex bulge 25. The depth D1 is greater than the depth D2. As a result, when the pillow 24, 26 is positioned inside the outer section 14, 16, the convex bulge 25 of the pillow will not reach all the way to the open top 32 of the outer section 14, 16. This difference in depths creates the space 27 between the two pillows (shown in FIG. 2A). In one embodiment, the space 27 is approximately 0.25 inches wide.

To ship an item in the reusable shipping container 10, the two inner sections 20, 22 are folded about the bridge 38 as described above to position the two pillows 24, 26 inside the two outer sections 14, 16. The item 58 is then placed on one of the two pillows, which resiliently supports the item on the convex bulge 25 of the pillow. The outer sections are then folded together about the hinge 18, causing the two pillows 24, 26 to deflect to accommodate the item 58 between them. The rims 36a, 36b of the two outer sections are brought into contact with each other and secured together to close the outer clamshell container 12, with the item 58 inside.

In the embodiment shown in FIGS. 2A-G, each inner section 20, 22 includes only one pillow, and each pillow 24, 26 extends substantially across the length L of the outer section 14, 16. Thus, the pillow 24, 26 occupies substantially all of the space inside the outer section 14, 16. The embodiments utilizing one domed pillow per inner section snap back into shape more easily, with each pillow regaining its convex shape. However, in other embodiments, each inner section 20, 22 could include two or more pillows, with each pillow extending across half or less than half of the length L of the outer section 14, 16. The pillows 24, 26 are shown with smooth surfaces and smooth bulges 25, but in other embodiments the surfaces of the pillows may include indentations, corrugations, ripples, and/or other suitable shapes and textures to provide additional support to the item 58 during shipment.

Another embodiment of a shipping container 10' is shown in FIGS. 3A-3C. Throughout the figures, like reference numerals have been used to identify like elements and parts, with the embodiment in FIGS. 3A-3C identified by numbers with primes. The elements identified with primes are the same as previously described, except where they are described differently below.

The container 10' has a wider bridge 38' than the bridge shown in FIGS. 2A-2E. In this embodiment, the inner sections 20', 22' each have a ledge or flange 621 on the perimeter edge 52', opposite the bridge 38'. The outer section 14' has a corresponding ridge 64' formed on the inside surface of the wall 150, opposite the bridge 38'. To position the pillow 24' inside the outer section 14', the user pushes on the pillow 24' to snap the flange 62' into place under the ridge 64'. Because the material is flexible, the pillow and flange 62' can bend to move around the ridge 64', so that the flange snaps into place. The flange 62' will then retain the pillow 24' in place inside the outer section 14'. To remove the pillow, the user can similarly push on the pillow to pop the flange 62' back out from under the ridge 64'.

In the embodiment shown in FIGS. 3A-3C, the two outer sections 14', 16' are secured together by means of a channel lock formed on the two rims 36a', 36b'. The outer section 14' includes a ridge or lip 78' that fits snugly into a corresponding channel or groove 80' formed in the outer section 16'. The snug, friction fit between the ridge and channel holds the two outer sections together.

Other means of securing the two outer sections together are possible. For example, conventional zip or cable ties 72 (shown in FIGS. 1A-1B) can be passed through aligned openings 60a, 60b (shown in FIG. 2C) in the rims 36a, 36b of the outer sections. These openings 60a, 60b align with each other when the outer sections are folded together, so that a cable tie can be passed through both openings to secure the two rims 36a, 36b together.

FIGS. 1A and 1B also show another feature of the reusable shipping container 10. The first outer section 14 includes legs or protrusions 68 on the outer surface of the bottom wall 34. These protrusions 68 match indentations 70 formed in the outer surface of the second outer section 16. These protrusions and indentations allow several containers 10 to be stacked together, with the protrusions on one container fitting into the indentations on the container below it. The stack of containers is more stable with these nesting protrusions and indentations. The containers 10 are also stackable when they are opened and unfolded (as shown in FIG. 2C). A second container can be easily placed on top of the first one, with the pillows and outer sections nesting inside each other to form a space-saving stack.

In the embodiment shown in FIGS. 1A and 1B, a sleeve 74 for a shipping label 76 is added to the molded container 10 on the outside surface of one of the two outer sections. The sleeve 74 can be made out of the same material that forms the entire container, such as polyethylene terephthalate (PET). For example, a rectangular sheet of PET can be thermally bonded, such as by radio frequency welding, to the outer container on three sides. The fourth side is left open so that the shipping label 76 can be inserted under the sheet and later removed. In addition to the shipping label, the outside surface of the clamshell container 12 can include embossed designs, words, or patterns to indicate information about the package, the material, the shipping company, or other information, or for aesthetic purposes.

The reusable container 10, 110 can be reused to ship various items of different sizes and shapes. The container 10, 110 does not use any disposable cushioning materials such as packing paper or peanuts that are discarded after use. Instead, the entire container can be used again to ship another item. When a first item is removed from inside the container, the two pillows 24, 26 spring back into their convex shape, each regaining its convex bulge 25. A new item of a different size and/or shape can then be placed between the two pillows, which will again deflect into a concave bowl 25a to receive the item snugly between them. The container 10, 110 can therefore be used multiple times.

The reusable shipping container 10, 110 can be manufactured in various sizes in order to accommodate various items for shipment. In one embodiment, the outer sections 14, 16 are approximately 9.90 inches in width W, 13.23 inches in length L, and 2.02 inches in depth D1. The inner container and pillow are scaled to fit inside the variety of sizes of outer sections.

Additionally, in all of the embodiments described, the container 10, 110 is integrally formed from one material, so that the container is one continuous piece. For example, in one embodiment, the container is formed from recycled polyethylene terephthalate (PET). A single sheet of PET can be vacuum-formed into the shape of the container 10, 10'. For example, in one embodiment, the container 10, 10' is formed from a sheet of PET approximately 0.045 inches thick and 4 feet wide. The sheet is heated until it starts to sag, so that it can becomes pliable. The pliable sheet is then pulled into a female mold in the shape of the open container, such as the container 10 shown in FIG. 2C. The mold includes very small holes connected to a vacuum pump, so that the PET sheet can be sucked down into the mold, conforming to the edges of the mold. The sheet is stretched in some places and pressed together in other places to alter the thickness of the resulting shaped container. For example, although the sheet, in one embodiment, starts with a uniform thickness of 0.045 inches, the portion of the sheet that is pulled into the pillow mold is stretched so that the resulting pillow is thinner than 0.045 inches, giving it additional flexibility. Similarly, the sheet gathers together along the corners of the outer sections, so that these corners have a thickness greater than 0.045 inches, giving them additional rigidity. After the sheet is formed into the mold, it is removed from the mold and the perimeter of the container 10 is cut around the molded portion of the sheet. While the molded portion is still warm, it is folded along the fold lines, and then cooled.

The recycled, reusable shipping container 10, 10' provides an efficient and environmentally friendly method of shipping. In one embodiment, the container is formed 100% from recycled material, such as PET from used water bottles. The molded, one-piece container is then used to resiliently cushion and protect an item during shipment, without requiring any additional cushioning or packing material. When the container reaches its destination, the item is removed and the pillows inside recover their shape, ready for another shipment. Another item of the same or a different size can then be shipped to another location in the same shipping container 10, 10'. Business and consumers can reuse these containers multiple times to ship items back and forth. For example, a manufacturer can ship full ink cartridges to consumers, who can ship empty ink cartridges back to the manufacturer. Businesses can use these containers to ship items back and forth between various sites and warehouses. Consumers can use them for normal everyday shipping, and can drop them off at a post office or shipping center to be reused again. After hundreds of uses, the shipping container 10, 10' can simply be recycled into a new container, according to the method described above.

The preceding description has been presented with reference to various embodiments of the invention. Persons skilled in the art and technology to which this invention pertains will appreciate that alterations and changes in the described structures and methods of operation can be practiced without meaningfully departing from the principle, spirit and scope of this invention.

What is claimed is:

1. A reusable shipping container, comprising:
an outer clamshell container comprising a first outer section and a second outer section connected to each other along an outer section hinge, each outer section comprising a floor;
a first inner cushion connected to the first outer section along a first cushion hinge; and
a second inner cushion connected to the second outer section along a second cushion hinge,
wherein the first inner cushion comprises a first convex pillow and an open bottom side, and the second inner cushion comprises a second convex pillow and an open bottom side,
wherein the first inner cushion is foldable along the first cushion hinge to position the first convex pillow inside the first outer section with a perimeter edge of the first convex pillow removably resting on the floor of the first outer section, the perimeter edge of the first inner cushion resting at an outer periphery of the floor such that the open bottom side of the first inner cushion has substantially the same dimensions as the floor of the first outer section, and
wherein the second inner cushion is foldable along the second cushion hinge to position the second convex pillow inside the second outer section, with a perimeter edge of the second convex pillow removably resting on the floor of the second outer section, the perimeter edge of the second inner cushion resting at an outer periphery of the floor such that the open bottom side of the second inner cushion has substantially the same dimensions as the floor of the second outer section,
wherein the first and second convex pillows each comprise a deflectable, continuous convex surface extending substantially across a length and a width of the respective outer section,
wherein the first and second convex pillows face each other when the first and second outer sections are folded together along the outer section hinge,
wherein the first and second convex pillows are deflectable into concave bowls to receive an item between them and have shape memory that returns the pillows to their convex shape when such item is removed, the pillows retaining their convex shape when removed from the outer sections, and
wherein the outer clamshell container, the first and second outer sections, the outer section hinge, the first and second inner cushions, the first and second convex pillows, and the first and second cushion hinges are integrally formed from one common material.

2. The reusable shipping container of claim 1, wherein the material is polyethylene terephthalate.

3. The reusable shipping container of claim 1, wherein the material is 100% recycled polyethylene terephthalate.

4. The reusable shipping container of claim 1, wherein the first and second inner cushions each comprise a single convex pillow.

5. The reusable shipping container of claim 1, further comprising a first bridge connecting the first inner cushion to the first outer section and a second bridge connecting the second inner cushion to the second outer section, and wherein the first and second cushion hinges connect the first and second bridges to the first and second outer sections, respectively.

6. The reusable shipping container of claim 5, wherein each of the first and second outer sections comprises a wall and a rim, and wherein each of the first and second bridges comprises a rim portion dimensioned to overlap the rim of the respective first and second outer sections, and a wall portion dimensioned to overlap the wall of the respective first and second outer sections.

7. The reusable shipping container of claim 6, wherein a bridge hinge separates the bridge into the rim portion and the wall portion.

8. The reusable shipping container of claim 1, wherein each of the first and second cushions is dimensioned to leave a space between itself and the floor of the first and second outer sections when the first and second cushions are deflected into a concave shape.

9. A reusable shipping container for shipping an item, comprising:
an outer container comprising first and second trays each comprising a rim and a floor, the first and second trays being engagable along their rims to close the outer container;
a first inner section comprising a first convex pillow dimensioned to fit within the first tray, the pillow comprising a hollow dome and an open bottom side opposite the dome, the dome comprising a deflectable, continuous, convex surface extending substantially across a length of the first tray, wherein a perimeter edge of the first pillow removably rests on the floor of the first tray, the perimeter edge of the pillow resting at an outer periphery of the floor such that the open bottom side of the first pillow has substantially the same dimensions as the floor of the first tray; and
a second inner section comprising a second convex pillow dimensioned to fit within the second tray, the pillow comprising a hollow dome and an open bottom side opposite the dome, the dome comprising a deflectable, continuous, convex surface extending substantially across a length of the second tray, wherein a perimeter edge of the second pillow removably rests on the floor of the second tray, the perimeter edge of the pillow resting at an outer periphery of the floor such that the open bottom side of the second pillow has substantially the same dimensions as the floor of the second tray,
wherein the first and second convex pillows face each other when the outer container is closed, and
wherein the first and second convex pillows are resilient and deflect into a concave shape to receive such item between them and wherein the pillows have shape memory that returns the pillows to their convex shape when such item is removed, the pillows retaining their convex shape when removed from the respective tray, and
wherein the outer container and the first and second inner sections are all formed from a common material.

10. The reusable shipping container of claim 9, wherein the material is 100% recycled polyethylene terephthalate.

11. The reusable shipping container of claim 9, wherein the first and second inner sections each comprise a single convex pillow.

12. The reusable shipping container of claim 9, wherein each of the first and second pillows is dimensioned to leave a space between itself and the floor of the first or second tray when the first and second pillows are deflected into the concave shape.

13. The reusable shipping container of claim 9, wherein the first and second trays each comprise a protrusion on an inside wall of the tray, and wherein the first and second pillows each comprise a flange extending from a bottom portion of the pillow, and wherein the first and second pillows are deflectable to position the flange below the protrusion to hold the pillow inside the tray.

14. The reusable shipping container of claim 9, wherein the first tray comprises at least one protrusion on an outer surface of the first tray, the protrusion being located to engage a recess on an outer surface of the second tray when the first and second trays are stacked.

15. The reusable shipping container of claim 9, wherein the first and second trays are connected to each other by a hinge.

16. The reusable shipping container of claim 15, wherein the first inner section is connected to the first tray by a first inner section hinge, and wherein the second inner section is connected to the second tray by a second inner section hinge.

17. The reusable shipping container of claim 9, wherein a space between the first and second convex pillows and the respective first and second trays is substantially empty, and wherein the pillows deflect into the space to receive such item.

18. The reusable shipping container of claim 9, wherein the first and second convex pillows each comprise a perimeter side wall connected between the perimeter edge and the deflectable convex surface of the respective pillow.

19. The reusable shipping container of claim 18, wherein a maximum depth of each of the first and second convex pillows is less than a depth of the respective tray.

20. The reusable shipping container of claim 19, wherein the first and second convex pillows each contact the respective tray only at the perimeter edge of the pillow.

21. A reusable shipping container for shipping an item, comprising:
   an outer container comprising first and second trays each comprising first and second pairs of oppositely facing sides and a concave inner space between the pairs of sides, and each tray comprising a rim and a floor, the first and second trays being engagable along their rims to close the outer container, the concave inner space of each tray facing the concave inner space of the other tray when the outer container is closed;
   a first pillow dimensioned to fit within the first tray with a perimeter edge of the first pillow removably resting on the floor of the first tray, and the first pillow having a deflectable, continuous convex outer surface extending substantially across the concave space between each of the first and second pairs of sides of the first tray, and having a concave inner space and an open bottom side, the perimeter edge of the first pillow resting at an outer periphery of the floor of the first tray such that the open bottom side of the first pillow has substantially the same dimensions as the floor; and
   a second pillow dimensioned to fit within the second tray with a perimeter edge of the second pillow removably resting on the floor of the second tray, and the second pillow having a deflectable, continuous convex outer surface extending substantially across the concave space between each of the first and second pairs of sides of the second tray, and having a concave inner space and an open bottom side, the perimeter edge of the second pillow resting at an outer periphery of the floor of the second tray such that the open bottom side of the second pillow has substantially the same dimensions as the floor,
   wherein the convex outer surfaces of the first and second pillows face each other when the outer container is closed, and
   wherein the first and second pillows are each resilient and, when the outer container is closed, deflect into the respective concave inner space of the first and second pillows to receive such item between the convex outer surfaces, and wherein the pillows have shape memory that returns the pillows to their convex shape when such item is removed, the pillows retaining their convex shape when removed from the respective trays, and
   wherein the first and second trays and the first and second pillows are made from the same material.

* * * * *